United States Patent Office 3,505,405
Patented Apr. 7, 1970

3,505,405
METHOD OF PREPARING ACYL-DIHYDROXY-
BENZOPHENONES
Otto S. Kauder, Jamaica, N.Y., assignor to Argus Chemical Corporation, Brooklyn, N.Y., a corporation of Delaware
No Drawing. Original application Oct. 22, 1965, Ser. No. 502,392. Divided and this application Feb. 15, 1967, Ser. No. 635,276
Int. Cl. C07c 49/44, 49/76
U.S. Cl. 260—591           9 Claims

ABSTRACT OF THE DISCLOSURE

A process for preparing acyl-dihydroxybenzophenones by reacting a 2,4-dihydroxyacylphenone with a carboxylic acid in the presence of a sulfonic acid catalyst. Acyl-dihydroxybenzophenones are useful as stabilizers for synthetic resins against photodegradation.

---

This is a continuation-in-part of application Ser. No. 246,353 filed on Dec. 21, 1962, now abandoned, and a division of application Ser. No. 502,392 filed Oct. 22, 1965, now abandoned.

This invention relates to a process for preparing acyl-dihydroxybenzophenones by reacting a 2,4-dihydroxyacyl-phenone with a carboxylic acid in the presence of a sulfonic acid catalyst.

The acyl-dihydroxybenzophenones produced in accordance with the process of the instant invention have an acyl-dihydroxybenzophenone nucleus, of the structure

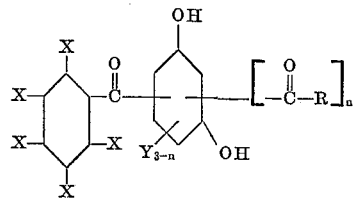

wherein the

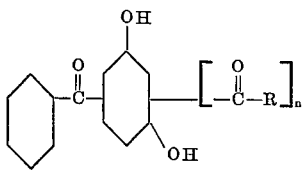

—C—R and the

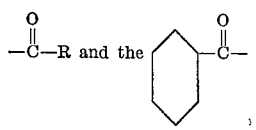

groups are ortho to at least one of the hydroxyl groups on the benzene ring and $n$ is 1 or 2. The hydroxyl groups are in a meta position, one to the other, on the benzene ring. R is an organic radical having from eleven to twenty-nine carbon atoms. Substituent groups can be attached to any of the ring carbon atoms of the above nucleus. Such substituent groups can modify the compatibility of the stabilizing composition with vinyl halide or olefin polymer resin compositions.

The acyl-dihydroxybenzophenones produced in accordance with the process of the instant invention are useful and effective in improving the resistance of vinyl halide and olefin polymer resins to degradative deterioration due to the effects of light.

Examples of acyl-dihydroxybenzophenones produced in accordance with the process of the instant invention, containing a nucleus of the above structure, have the following general formula:

wherein the X-radicals are selected from the group consisting of hydrogen, halogen (such as fluorine, chlorine, bromine and iodine, and preferably chlorine or bromine), nitro and organic radicals of from one to about thirty carbon atoms; wherein the Y-radicals are selected from the group consisting of hydrogen, halogen (such as fluorine, chlorine, bromine and iodine, and preferably chlorine or bromine), and organic radicals of from one to about thirty carbon atoms; and wherein the

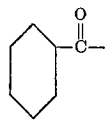

groups are ortho to at least one of the hydroxyl groups on the benzene ring, and said hydroxyl groups are in a relationship meta to each other, the —R being an organic radical having from eleven to twenty-nine carbon atoms. $n$ is an integer of from one to two: the total number of acyl groups and Y-radicals is thus always three, and is sufficient to fill each of the three remaining unsubstituted positions on the benzene ring.

Within the above limitations, the X and Y-radicals substituted on any ring or on different rings can be the same or different. An X and a Y-radical of any acyl hydroxybenzophenone can be the same or different radicals; within the above limitations, they can also be the same as, or different from, the R-radical of the acyl group.

When the X and Y-radicals are organic radicals they are selected from the group consisting of aliphatic, aromatic, alicyclic, and heterocyclic groups of from one to thirty carbon atoms. However, there is no upper limit, other than impracticability, on the number of carbon atoms in the organic radical. Typical organic radicals are alkyl, alkoxy, alkenyl, alkynyl, aryl, alkaryl, aralkyl, and cycloalkyl radicals. These organic radicals may, if desired, contain inert, nonreactive substituents such as halogen and other carbocyclic and heterocyclic ring structures.

Typical organic radicals are, for example, methyl, ethyl, propyl, isopropyl, butyl, isobutyl, t-butyl, amyl, isoamyl, n-octyl, isooctyl, 2-ethylhexyl, t-octyl, decyl, ethylnonyl, ethylmethyloctyl, diethylheptyl, undecyl, dodecyl, pentadecyl, octadecyl, tricosyl, and nonacosyl; methoxy, ethoxy, butoxy, and heptoxy; allyl, hexenyl, linoleyl, ricinoleyl, oleyl, undecadienyl, propyloctadecenyl; propynyl, hexynyl, ethylheptadecadiynyl, undecynyl; monochloroethyl, perchloroethyl, monobromopropyl, tribromopropyl, fluoroheptyl, chlorododecyl, chlorododecenyl, chlorododecynyl, chlorotricosyl; phenyl, naphthyl, p-tolyl, xylyl, butylphenyl and nonylphenyl; benzyl, 4-phenylbutyl, and 8-bromophenylheptadecyl; cyclopentyl, cyclohexyl, and cycloheptyl.

The R-radical of the acyl group is an organic radical having from eleven to twenty-nine carbon atoms selected from the group consisting of aliphatic, alicyclic, and heterocyclic groups. Typical R-radicals are selected from the group consisting of alkyl, alkenyl, alkynyl, and cycloalkyl groups. The R-radical may, if desired, contain inert non-reactive substituents such as halogen and carbocyclic and heterocyclic ring structures.

Typical R-radicals are, for example, undecyl, dodecyl, pentadecyl, octadecyl, tricosyl, nonacosyl, diethylheptyl, isopropylundecyl; linoleyl, ricinoleyl, oleyl, undecadienyl, propyloctadecenyl; undecynyl, linolenyl, ethylheptadecadiynyl; monochlorododecyl, trichlorododecyl, chlorododecenyl, chlorododecynyl, chlorotricosyl, hydroxychloropentadecyl, bromoheptadecyl; cyclopentyl, cyclohexyl, and cycloheptyl; and tetrahydrofurfuryl.

As typical examples of acyl-dihydroxybenzophenones which can be prepared in accordance with the instant invention there can be mentioned the following:

1. 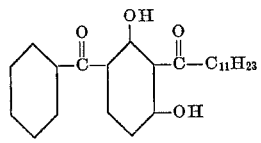

2. 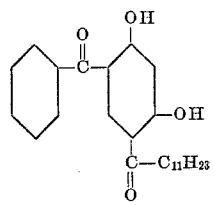

3. 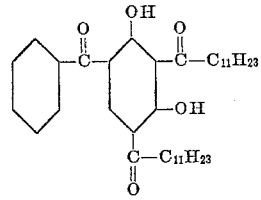

4. 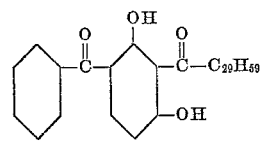

5. 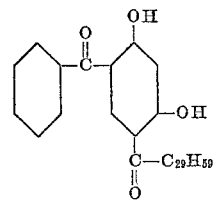

6. 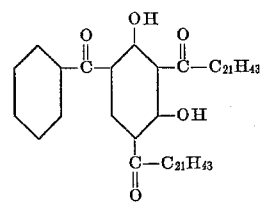

7. 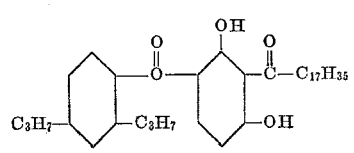

8. 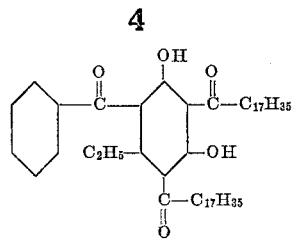

9. 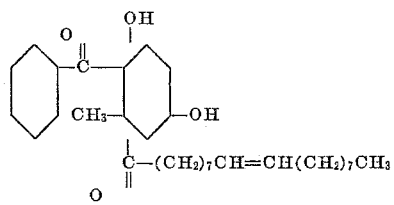

10. 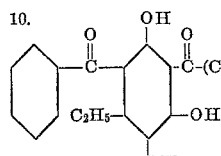

11. 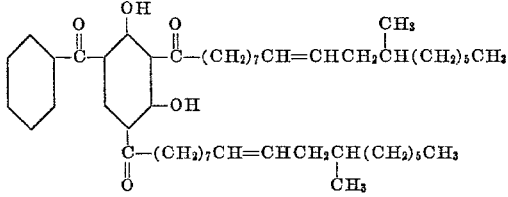

12. 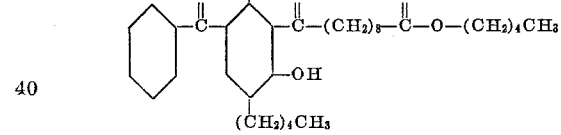

13. 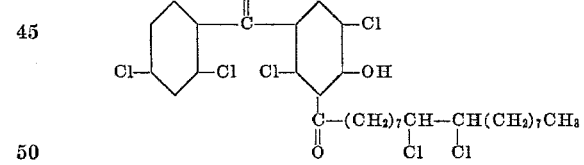

14. 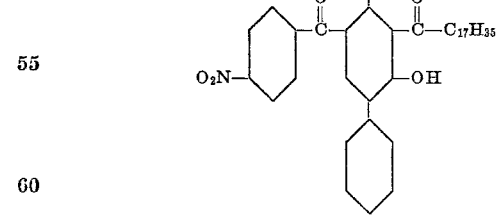

15. 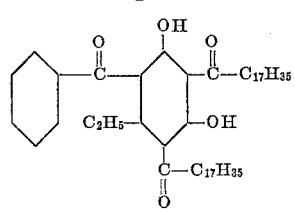

16. 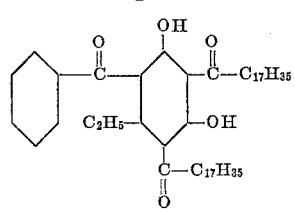

17. 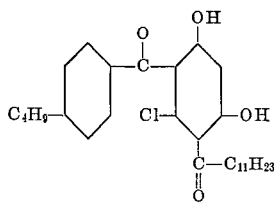

18. 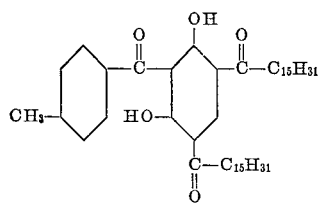

19. 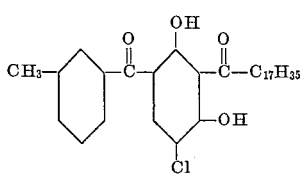

20. 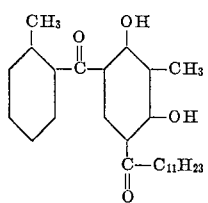

21. 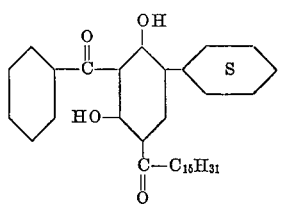

22. 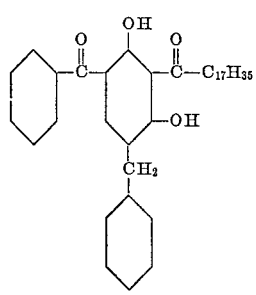

23. 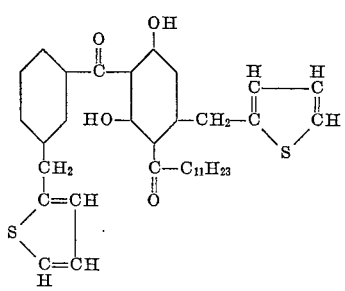

24. 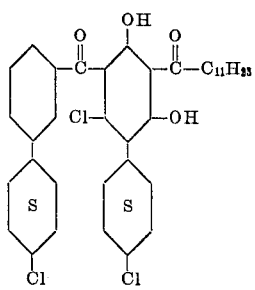

Several methods are known for the synthesis of acyl-dihydroxy-benzophenones. One is the Friedel-Crafts ketone synthesis in the presence of known catalysts such as aluminum trichloride, stannic chloride, boron tri-fluoride, or fused zinc chloride. Starting products, in the preparation of the compositions of this invention by the Friedel-Crafts reaction, are a 2,4-dihydroxybenzophenone and an acid chloride,

having an

moiety as described above; or a 2,4-dihydroxyacylophenone carrying the

moiety and an aroyl chloride.

It was discovered that the acyl-dihydroxybenzophenones could also be synthesized by reacting 2,4-dihydroxybenzophenone with a carboxylic acid,

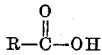

having an

moiety as described above in the presence of catalytic (i.e. less than stoichiometric) quantities of a sulfonic acid. It was contrary to the expectations and teachings of those skilled in the art to make the di- and tri-ketones of this invention by this novel method.

In accordance with the process of the instant invention acyl-dihydroxybenzophenones can be prepared by heating 2,4-dihydroxybenzophenone with a carboxylic acid having from twelve to thirty carbon atoms for about 3 to 30 hours at a temperature of from 150° to 190° C. in the presence of 2–20 mole percent benzenesulfonic acid, toluenesulfonic acid, naphthalenesulfonic acid, polystyrenesulfonic acid, methanesulfonic acid, ethanesulfonic acid, or sulfamic acid calculated on the basis of the 2,4-dihydroxybenzophenone present in the reaction mixture.

The reaction may be conducted in an inert solvent such as xylene or kerosene. The water of reaction may be removed therefrom by the use of a Dean-Stark water trap. The crude reaction product may be purified by washing with dilute sodium carbonate solution to remove any remaining acid, dried, and fractionally dissolved in methanol at from 40° to 65° C. Warm methanol is a useful solvent for crystallizing the acyl-dihydroxybenzophenones from dilute solutions. Benzene, toluene, heptane, acetone and butanol are useful solvents for crystallizing the acyl-dihydroxybenzophenones from highly concentrated solutions.

Acyl-dihydroxybenzophenones can also be synthesized in accordance with the new process of this invention by reacting a 2,4-dihydroxyacylophenone carrying the

moiety with benzoic acid in the presence of 1–10 mole percent of benzenesulfonic acid, toluenesulfonic acid, naphthalenesulfonic acid, polystyrenesulfonic acid, methanesulfonic acid, ethanesulfonic acid, or sulfamic acid, calculated on the basis of the total amount of reactants present.

The novel process of preparing the acyl-dihydroxybenzophenones of this invention may therefore be broadly characterized as the reaction of a 2,4-dihydroxyacylphenone with a carboxylic acid in the presence of a sulfonic acid catalyst. The carboxylic acid is aliphatic or aromatic if the other ingredient is a benzophenone, otherwise it is an aromatic acid. As a sulfonic acid catalyst benzenesulfonic acid, toluenesulfonic acid, naphthalenesulfonic acid, polystyrenesulfonic acid, methanesulfonic acid, ethanesulfonic acid, and sulfamic acid have been found effective. The quantity of sulfonic acid catalyst is critical and must be at least one mole percent on the basis of total reactants or two mole percent calculated on the basis of the ketone to be acylated.

The following examples in the opinion of the inventor represent preferred embodiments of this invention.

EXAMPLE 1

3-monolauroyl - 2,4 - dihydroxybenzophenone, 5-monolauroyl - 2,4 - dihydroxybenzophenone, and 3,5-dilauroyl-2,4-dihydroxybenzophenone were then prepared by the novel method of this invention:

73.3 g. of lauric acid (4% excess) and 75 g. of 2,4-dihydroxybenzophenone were refluxed at 173° C. with 60 ml. xylene and 1.5 g. of p-toluenesulfonic acid. A Dean-Stark water trap was used in the reflux apparatus to collect water of reaction. After twenty hours, 7.5 ml. of water had accumulated. The reaction mixture was cooled, mixed with 150 ml. ethanol and allowed to crystallize in the cold, giving 18 g. product with a melting range of 74°–79° C. The mother liquor was concentrated, yielding 50 g. product with a melting range of 58°–61° C. A mixture of the two materials melted at 63°–73° C.

Repeated recrystallizations from ethanol did not effect any substantial purification.

The entire product was therefore stirred with 5% sodium carbonate solution to remove any residual lauric acid, dried, and fractionally dissolved in methanol at 50°–55° C. using 4 g. methanol per gram of solid. By this method the material was separated into two distinct fractions with different solubilities and melting points.

A molecular weight determination, using the Rast method, indicated that the monolauroyl-2,4-dihydroxybenzophenones (a mixture of 3-lauroyl-2,4-dihydroxybenzophenone and 5-lauroyl-2,4-dihydroxybenzophenone) constituted the fraction with a melting point of 77°–80° C., and that the dilauroyl-2,4-dihydroxybenzophenone was the fraction having a melting point of 58°–61° C.

The two monolauroyl isomers were separated by extensive fractional recrystallization. The melting points of the two fractions were found to be 80°–81° C. and 59°–61° C.

EXAMPLE 2

An isomeric mixture of bromoheptadecyl-dihydroxybenzophenones was prepared by the novel method of this invention by reacting dihydroxybromoheptadecylophenone with benzoic acid in the presence of 1 mole percent of benzenesulfonic acid calculated on the basis of the total amount of reactants present. The resultant mixture was purified by repeated fractional recrystallization.

EXAMPLE 3

An isomeric mixture of linolenyl-dihydroxybenzophenones was prepared by the novel method of this invention by reacting dihydroxylinolenylophenone with benzoic acid in the presence of 10 mole percent of toluenesulfonic acid calculated on the basis of the total amount of reactants present. The resultant mixture was purified by repeated fractional recrystallization.

EXAMPLE 4

An isomeric mixture similar to that of Example 3 was prepared in accordance with the novel method of this invention by reacting equimolar quantities of 2,4-dihydroxybenzophenone and linolenic acid in the presence of 20 mole percent of toluenesulfonic acid calculated on the basis of the amount of 2,4-dihydroxybenzophenone present in the reaction mixture. The resultant mixture was purified by repeated fractional recrystallization.

I claim:

1. A process for preparing carboxyacyl-dihydroxybenzophenones and water, by at least one of the following reactions, which comprises (A) reacting a 2,4-dihydroxybenzophenone with an acylating monocarboxylic acid or (B) reacting a 2,4-dihydroxycarboxyacylphenone with an aromatic monocarboxylic acid, each of the above reactions being conducted in the presence of from 1 to 20 mole percent of a sulfonic acid catalyst, wherein the organic radical of the acylating monocarboxylic acid and the acyl group of the 2,4-dihydroxycarboxyacylphenone are selected from the group consisting of alkyl, alkenyl, alkynyl, and cycloalkyl radicals containing from about eleven to about twenty-nine carbon atoms; carbocyclic aromatic radicals containing from about six to about thirty-six carbon atoms, and heterocyclic radicals selected from the group consisting of tetrahydrofurfuryl and thienyl radicals, and the aromatic radical of the aromatic monocarboxylic acid is a carbocyclic aromatic radical containing from about six to about thirty-six carbon atoms.

2. A process in accordance with claim 1 wherein the acylating monocarboxylic acid is an aromatic monocarboxylic acid containing a carbocyclic aromatic radical having from about six to about thirty-six carbon atoms.

3. A process in accordance with claim 2 wherein the aromatic acid is benzoic acid.

4. A process in accordance with claim 1 wherein the acylating monocarboxylic acid is an aliphatic acid containing an organic radical selected from the group consisting of alkyl, alkenyl, alkynyl and cycloalkyl radicals having from about eleven to about twenty-nine carbon atoms.

5. A process in accordance with claim 4 wherein the aliphatic acid is lauric acid.

6. A process in accordance with claim 5 wherein the 2,4-dihydroxycarboxyacylphenone is 3-monolauroyl-2,4-dihydroxybenzophenone.

7. A process in accordance with claim 5 wherein the 2,4-dihydroxycarboxyacylphenone is 5-monolauroyl-2,4-dihydroxybenzophenone.

8. A process in accordance with claim 5 wherein the 2,4-dihydroxycarboxyacylphenone is 3,5-dilauroyl-2,4-dihydroxybenzophenone.

9. A process in accordance with claim 4 wherein the aliphatic acid is stearic acid.

References Cited

UNITED STATES PATENTS

| | | | |
|---|---|---|---|
| 3,098,099 | 7/1963 | Conte et al. | 260—591 |
| 2,890,201 | 6/1959 | Hardy | 260—45.95 |
| 3,000,855 | 9/1961 | Clark et al. | 260—45.95 |
| 3,123,647 | 3/1964 | Duennenberger | 260—591 |

OTHER REFERENCES

Kressman, Manufacturing Chemist, pp. 457–458 (November 1956).

Richter, Textbook of Organic Chemistry, p. 483 (1938) Wiley Publishers.

Adams, Organic Reactions, vol. 1, pp. 347–349 (1963).

DANIEL D. HORWITZ, Primary Examiner

U.S. Cl. X.R.

252—426; 260—45.95, 332.3, 347.8, 473

PO-1050
(5/69)

UNITED STATES PATENT OFFICE
CERTIFICATE OF CORRECTION

Patent No. 3,505,405        Dated April 7, 1970

Inventor(s) Otto S. Kauder        PAGE - 1

It is certified that error appears in the above-identified patent and that said Letters Patent are hereby corrected as shown below:

Column 1, line 23, delete the period (.) after "abandoned";
Column 1, lines 43 to 50, should read as follows:

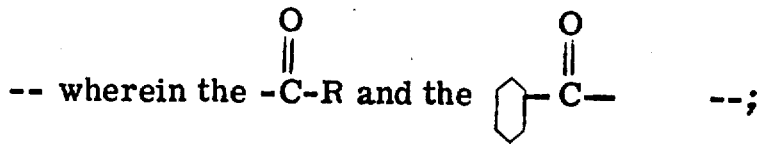

Column 2, lines 22 to 28, should read as follows:

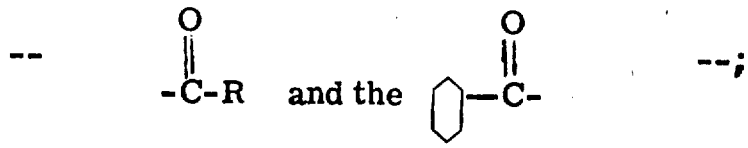

Column 3, line 70, formula No. 7 should read as follows:

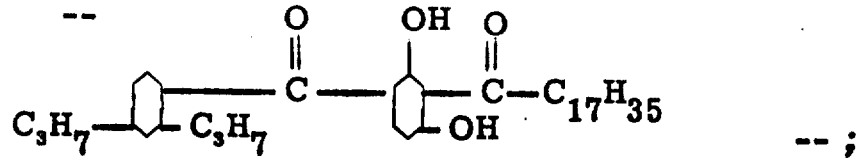

PO-1050
(5/69)

UNITED STATES PATENT OFFICE

Page 2

CERTIFICATE OF CORRECTION

Patent No. 3,505,405             Dated April 7, 1970

Inventor(s) Otto S. Kauder

It is certified that error appears in the above-identified patent and that said Letters Patent are hereby corrected as shown below:

Column 4, line 10, formula No. 9 should read as follows:

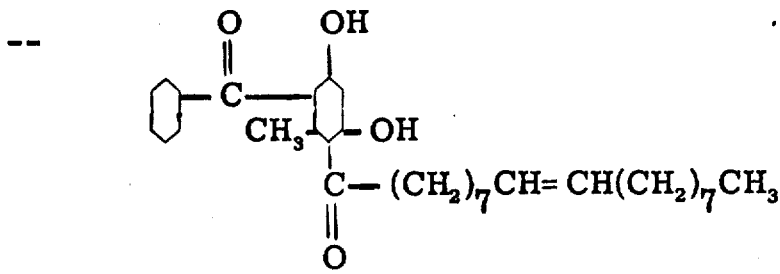

;

Column 5, line 1, formula No. 17 should read as follows:

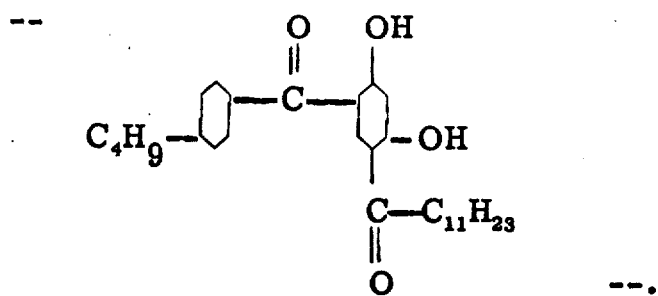

.

SIGNED AND
SEALED
SEP 15 1970

(SEAL)
Attest:

Edward M. Fletcher, Jr.
Attesting Officer

WILLIAM E. SCHUYLER, JR.
Commissioner of Patents